United States Patent [19]
Cova et al.

[11] Patent Number: 5,813,258
[45] Date of Patent: Sep. 29, 1998

[54] QUICK RELEASE LOCKING SYSTEMS

[76] Inventors: Nick Cova, 948 S. 900 East, Salt Lake City, Utah 84105; Shawn Lyons-Smith, 3211 Bellomy La., Boise, Id. 83703

[21] Appl. No.: 724,269

[22] Filed: Sep. 18, 1996

[51] Int. Cl.⁶ ........................................... E05B 71/00
[52] U.S. Cl. ..................... 70/225; 70/233; 301/124.2; 403/409.1; 403/DIG. 8; 411/354
[58] Field of Search ..................... 70/225, 233, 261; 301/110.5, 124.2; 403/DIG. 8, 374, 321, 409.1; 411/354

[56] References Cited

U.S. PATENT DOCUMENTS

| | | | |
|---|---|---|---|
| 1,015,907 | 1/1912 | Ryder | 292/86 X |
| 1,281,773 | 10/1918 | Foster | 403/374 X |
| 1,896,645 | 2/1933 | Pfauser | 403/321 |
| 3,229,791 | 1/1966 | Soman | 403/409.1 X |
| 4,020,613 | 5/1977 | Reynolds et al. | 403/321 |
| 4,114,409 | 9/1978 | Scire . | |
| 4,621,873 | 11/1986 | Weinstein et al. . | |
| 4,724,692 | 2/1988 | Turin et al. . | |
| 4,865,366 | 9/1989 | Kretchman | 292/86 |
| 4,964,287 | 10/1990 | Gaul . | |
| 5,022,672 | 6/1991 | Kawai . | |
| 5,027,628 | 7/1991 | DeRocher et al. . | |
| 5,249,879 | 10/1993 | Zoor | 403/374 |
| 5,291,763 | 3/1994 | Cuisinot | 70/233 X |
| 5,339,660 | 8/1994 | Fell . | |
| 5,479,839 | 1/1996 | Chang | 70/233 X |
| 5,526,661 | 6/1996 | Lin | 411/354 X |

FOREIGN PATENT DOCUMENTS

| | | | |
|---|---|---|---|
| 919162 | 2/1947 | France | 403/374 |
| 4104666 A | 9/1992 | Germany | 403/321 |
| 450881 | 8/1949 | Italy | 403/374 |
| 61229 | 6/1948 | Netherlands | 403/374 |
| 982 | 2/1902 | United Kingdom | 411/354 |

*Primary Examiner*—Lloyd A. Gall
*Attorney, Agent, or Firm*—Workman, Nydegger & Seeley

[57] ABSTRACT

A quick release mechanism is provided having a drawbar with a camming lock positioned at one end and an end cap positioned at the opposing end. The camming lock includes an axle having a plurality of primary locking slots formed therein. The camming lock also includes a cam having a receiving chamber formed therein and a tongue radially projecting therefrom. A plurality of primary locking slots extend from the tongue to the receiving chamber. The receiving chamber is configured to receive the axle so that the cam can freely rotate relative to the axle and the primary locking slots can be aligned with the secondary locking slots. Selectively positioned within secondary locking slots are a series of pins and springs. When secondary locking slots and the primary locking slots are aligned, select pins extend therebetween, thereby preventing annular rotation of the cam relative to the axle. The quick release mechanism also includes a lever having a channel formed at one end with a series of key pins projecting therefrom. As the tongue is received within the channel, the key pins selectively position the pins within the cam to allow free rotation of the cam relative to the axle. By selectively rotating the cam relative to the axle using the lever, structure position between the camming lock and the end cap can be compressed along the drawbar.

20 Claims, 5 Drawing Sheets

QUICK RELEASE LOCKING SYSTEMS

BACKGROUND OF THE INVENTION

1. The Field of the Invention

The present invention relates to quick release systems and, more specifically, quick release systems that can be selectively locked and unlocked by a key.

2. The Relevant Technology

Quick release mechanisms can be used in a variety of environments to enable quick release or attachment of an object to a structure. In one common use, quick release mechanisms are used to enable quick removal and attachment of bicycle wheels to a bicycle. A quick release mechanism typically comprises some form of a camming mechanism having a lever and being attached to a drawbar. By rotation of the lever, the camming mechanism either increases or decreases the effective length of the drawbar. As the length of the drawbar decreases, structures positioned on the drawbar are clamped together, thereby securing the structures to the drawbar. By rotating the lever in the opposite direction, the clamping force is released, thereby allowing the structure to be removed from the drawbar.

Although conventional quick release mechanisms have found extensive use, they also have several drawbacks. For example, quick release mechanisms make it easy for parts being secured by such a device to be stolen. As a result, bicyclists are often required to remove their bicycle wheels and other similarly attached structures and either take them with them or separately lock them up.

Attempts have been made to incorporate a lock with a quick release mechanism to prevent unwanted opening of the quick release mechanism. The addition of the locking structure, however, has significantly increased the size of the quick release mechanism, thereby decreasing the aesthetic appearance and the streamline nature of the bicycle. Conventional locking systems are also relatively awkward and time consuming, thereby thwarting the benefit of the quick release mechanism. In addition, many of the locking mechanisms use a uniquely designed key. However, since the key is typically the same configuration for each lock, any of the locks can be opened once a key is obtained.

Another problem with the attachment of conventional locks is that they increase the weight of the bicycle. This is significant in a sport which is continually striving to minimize additional weight. In one attempt to minimize the weight of the quick release mechanism, the lever has been shortened. By shortening the lever, however, tightening of the cam becomes more difficult, thereby jeopardizing whether the quick release mechanism is sufficiently tight to prevent the attached structure from accidentally falling off.

OBJECTS AND BRIEF SUMMARY OF THE INVENTION

Accordingly, it is an object of the present invention to provide improved quick release mechanisms that can be locked.

Another object of the present invention is to provide quick release mechanisms that can be easily and quickly locked.

Yet another object of the present invention is to provide quick release mechanisms discussed above that have minimal weight.

Also, another object of the present invention is to provide quick release mechanisms, as discussed above, that are not significantly larger than non-locking quick release mechanisms.

Still another object of the present invention is to provide a quick release mechanism wherein the lever for tightening the mechanism is removable for minimizing the weight of the mechanism.

Finally, another object of the present invention is to provide quick release mechanisms, as described above, wherein a discrete key opens a discrete lock.

To achieve the foregoing objects, and in accordance with the invention as embodied and broadly described herein, a quick release mechanism is provided. The quick release mechanism includes a drawbar having a camming lock positioned at one end and an end cap positioned at the opposing end. The camming lock includes an axle having a plurality of primary locking slots formed therein. The camming lock also includes a cam having an interior surface defining a receiving chamber. The receiving chamber is configured to receive the axle such that the cam can selectively rotate about the axle.

The cam also includes an exterior surface that is asymmetrically formed around the interior surface of the cam. As such, the distance between the interior surface of the receiving chamber and the exterior surface of the cam varies at points around the cam. The cam further includes a tongue that radially projects out from the exterior surface of the cam. The tongue has an end face with a plurality of secondary locking slots extending from the end face to the interior surface of the cam. The secondary locking slots are configured to be selectively aligned with the primary locking slots.

Positioned within each of the aligned primary locking slots and secondary locking slots is a spring, a locking pin, and an alignment pin. When the cam is in the locked position, the spring biases the locking pin so that the locking pin extends between the axle and the cam, thereby preventing annular rotation of the cam relative to the axle.

The quick release mechanism also includes a lever having a channel formed at one end with a plurality of key pins projecting therefrom. The channel is configured to selectively receive the tongue on the cam so that the pins are received within the secondary locking slots. As the key pins are received within the secondary locking slots, the locking pins are selectively positioned to enable the cam to rotate relative to the axle. Furthermore, by inserting the tongue of the cam within the channel on the lever, the lever is also used for selectively rotating the cam.

As the cam is rotated between the locked to unlocked position, the length of the drawbar is effectively shortened and lengthened. More specifically, the cam selectively covers or uncovers a portion of the drawbar. As a portion of the drawbar is incrementally covered by the cam, those structures positioned on the drawbar between the cam and the end cap are compressed together, thereby securing the elements to the drawbar. In contrast, by unlocking the cam, the compressive force is released, thereby allowing the structure to be removed.

Based on the above disclosure, the inventive quick release mechanism has a variety of benefits. By way of example and not by limitation, by selectively varying the lengths of the locking pins, alignment pins, and key pins, each camming lock can be formed having a unique keying sequence. Furthermore, since the locking mechanism is directly incorporated into the camming structure, the overall size and weight of the quick release mechanism is minimized. Finally, since the lever is selectively removed from the camming lock, the lever can be any desired length to optimize the leverage rotation of the cam without increasing the weight of the quick release mechanism.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
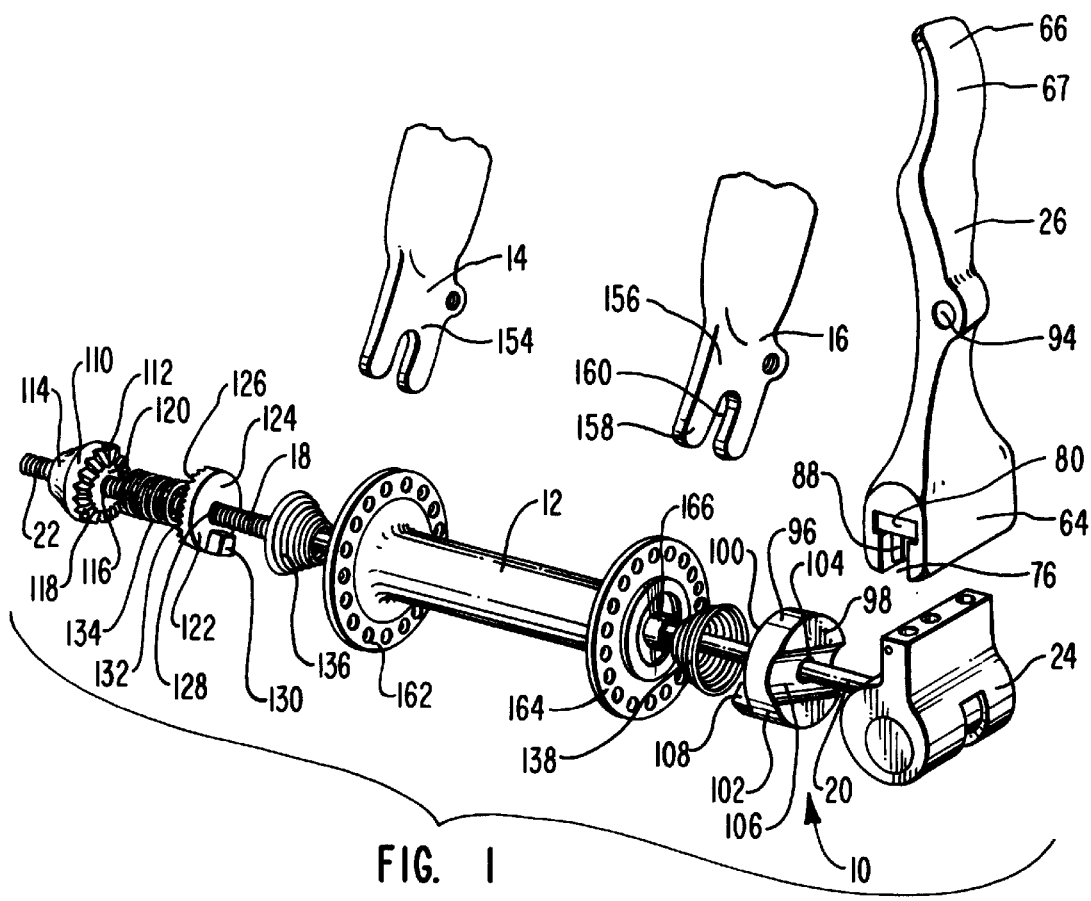
FIG. 1 is a perspective view of a quick release mechanism used for securing the hub of a bicycle wheel to the forks of a bicycle.

Depicted in FIG. 1 is one embodiment of a quick release mechanism 10 incorporating features of the present invention. As shown in FIG. 1, quick release mechanism 10 comprises a drawbar 18 having a threaded first end 20 and an opposing threaded second end 22. As used in the embodiment shown in FIG. 1 and discussed later in greater detail, drawbar 18 is used to attach a hub 12 of a bicycle wheel to a pair of forks 14 and 16.

Figure 2:
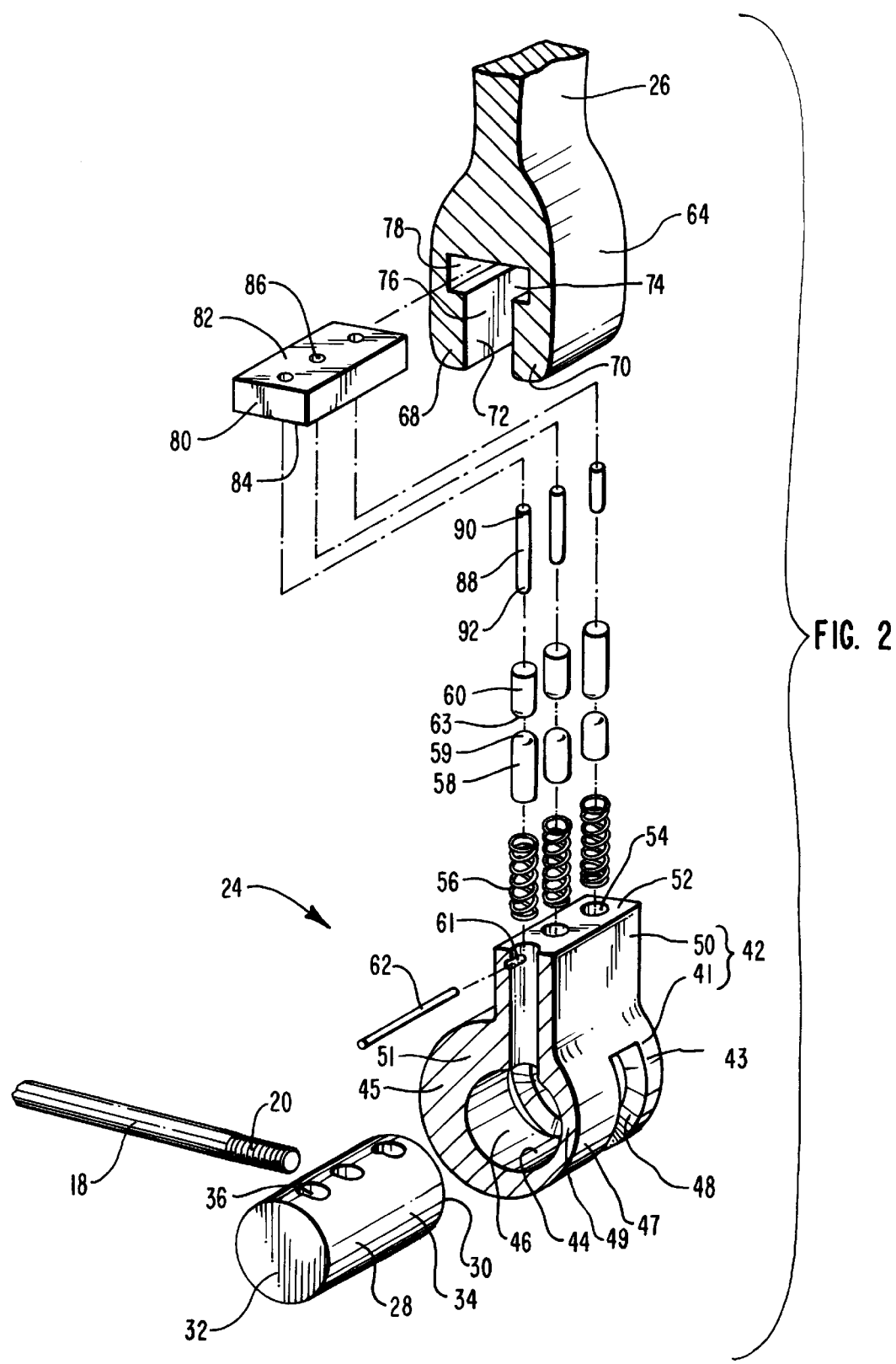
FIG. 2 is a partially cut-away exploded view of the camming lock and lever shown in FIG. 1.
Figure 3:
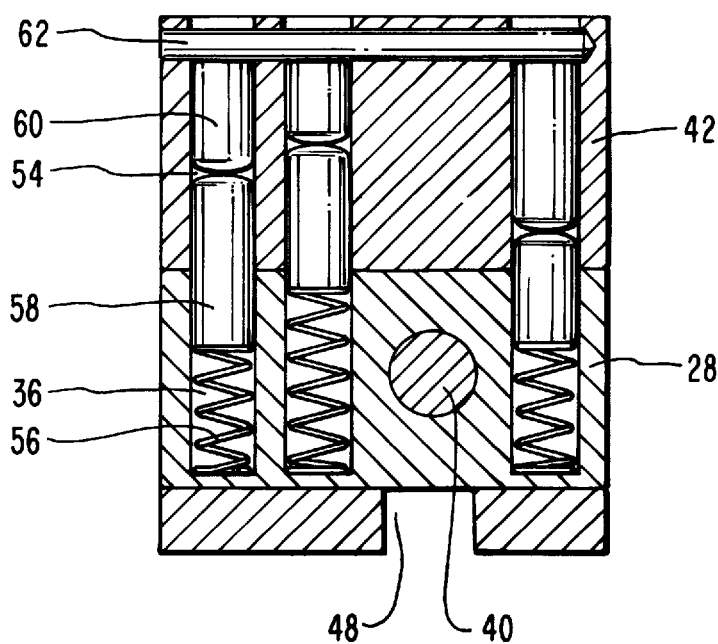
FIG. 3 is a cross-sectional front view of the camming lock shown in FIG. 2 in a locked position.

Attached to first end 20 of drawbar 18 is a camming lock 24. Camming lock 24 is selectively unlocked and rotated by a lever 26. As best depicted in FIG. 2, camming lock 24 comprises an axle 28 having opposing ends 30 and 32 with an exterior surface 34 extending therebetween. Radially bored into exterior surface 34 are a series of discrete primary locking slots 36 that are longitudinally aligned. As best seen in FIG. 3, axle 28 also includes a threaded bore 40 that is preferably recessed within exterior surface 34 at an orientation perpendicular to primary slots 36. Threaded bore 40 is used for receiving in threaded engagement first end 20 of drawbar 18. Although axle 28 is shown as being substantially cylindrical, in alternative embodiments, axle 28 can have a transverse cross section that is semicircular or substantially circular but having a longitudinal portion of the exterior surface recessed or cut away.

Referring back to FIG. 2, camming lock 24 also comprises a cam 42. Cam 42 includes a substantially cylindrical body 41 having opposing ends 43 and 45 with an exterior surface 47 extending therebetween. Body 41 also has an interior surface 44 defining a receiving chamber 46 longitudinally extending between opposing ends 43 and 45. Receiving chamber 46 is asymmetrically positioned within body 41 of cam 42 such that the radial distance between interior surface 44 of receiving chamber 46 and exterior surface 47 of body 41 varies at points around cam 42. Receiving chamber 46 is also configured to receive axle 28 so that cam 42 can selectively rotate about axle 28.

Again, although exterior surface 47 of body 41 is shown as being substantially cylindrical, in alternative embodiments only a portion of exterior surface 47 need be rounded. Likewise, the distance between interior surface 44 and exterior surface 47 may gradually vary only around a portion of cam 42 and be relatively constant around the remaining portion thereof. To aid in the general discussion of cam 42, cam 42 is also generally defined as having a narrow portion 49 extending between interior surface 44 and exterior surface 47 and also a wide portion 51 likewise extending between interior surface 44 and exterior surface 47.

Cam 42 also includes a rotation slot 48 that runs partially around the perimeter of cam 42 and extends between exterior surface 47 of cam 42 and receiving chamber 46. Rotation slot 48 is configured to allow first end 20 of drawbar 18 to pass through rotation slot 48 so as to enable threaded engagement between first end 20 of drawbar 18 and threaded bore 40 of axle 28. Rotation slot 48 also provides a channel in which drawbar 18 travels when cam 42 rotates relative to axle 28. Finally, the insertion of drawbar 18 through rotation slot 48 and into axle 28 acts in part as a lock to prevent axle 28 from accidentally falling out of receiving chamber 46.

Cam 42 is also shown as comprising a tongue 50 that radially projects out from exterior surface 47 of body 41. Tongue 50 has a substantially flat end face 52 with a plurality of secondary locking slots 54 extending from end face 52 to receiving chamber 46. The number of secondary locking slots 54 corresponds to the number of primary locking slots 36. Furthermore, secondary locking slots 54 are configured so as to enable selective alignment with each of primary locking slots 36 when axle 28 is received within receiving chamber 46 of cam 42.

With primary locking slots 36 aligned with secondary locking slots 54, a spring 56, locking pin 58, and alignment pin 60 is consecutively received within each of secondary locking slots 54. Each locking pin 58 is shown as having an end 59 that is rounded. Likewise, each alignment pin has an end 63 that is rounded. In alternative embodiments, ends 59 and 63 can also be tapered or flat.

Tongue 50 is also shown in FIG. 2 as having a narrow passageway 61 extending between opposing ends 43 and 45 and is positioned so as to partially extend through each of secondary locking slots 54. A retaining pin 62 is configured to be received within passageway 61 after spring 56, locking pin 58, and alignment pin 60 have been received within secondary locking slots 54. Retaining pin 62 acts to effectively decrease the diameter of second locking slots 54, thereby preventing alignment pins 60 from accidentally falling out of secondary locking slots 54.

As shown in FIG. 3, each group of spring 56, locking pin 58, and alignment pin 60 are selectively configured to have a desired position when primary locking slots 36 and secondary locking slots 54 are aligned. More specifically, each spring 56 is contained within primary locking slot 36, each alignment pin 60 is contained within secondary locking slot 54, and each locking pin 58 is positioned so as to extend between primary locking slot 36 and secondary locking slot 54. In this position, locking pins 58 prevent annular rotation of cam 42 with respect to axle 28.

Referring back to FIG. 1, lever 26 is shown as comprising an elongated shaft having a key end 64 and an opposing tool end 66. Positioned at tool end 66 is a tire spoon 67. In alternative embodiments, other tools can likewise be positioned at tool end 66. For example, a screw driver tip, can opener, or tire stem remover could be positioned thereat. Lever 26 is also shown as having an attachment aperture 94 extending therethrough. Attachment aperture 94 can be used for receiving a key chain, string, or other type of cord for easily carrying lever 26.

As better shown in FIG. 2, formed at key end 64 are a pair of opposing fingers 68 and 70 each having an inside face 72. Opposing inside faces 72 define a narrow capture channel 76 which extends to a widened retaining slot 78. Capture channel 76 and retaining slot 78 combine to from a T-shaped slot 74.

Lever 26 further includes a key block 80 having an upper face 82 and a lower face 84. A plurality of apertures 86 extend between faces 82 and 84. The number of apertures 86 correspond to the number of secondary locking slots 54. Lever 26 further includes a plurality of key pins 88 each having a first end 90 and opposing second end 92. First end 90 of each key pin 88 is configured to be securely received within one of apertures 86 at lower face 84. By way of example and not by limitation, this can be accomplished by either pressure fitting or welding key pins 88 within apertures 86. Key pins 88 are secured within apertures 86 so that second end 92 of each key pin 88 projects from key block 80. As better seen in FIG. 1, in this position key block 80 can be securely fastened within retaining slot 78 such that key pins 88 are disposed within capture channel 76.

Figure 4:
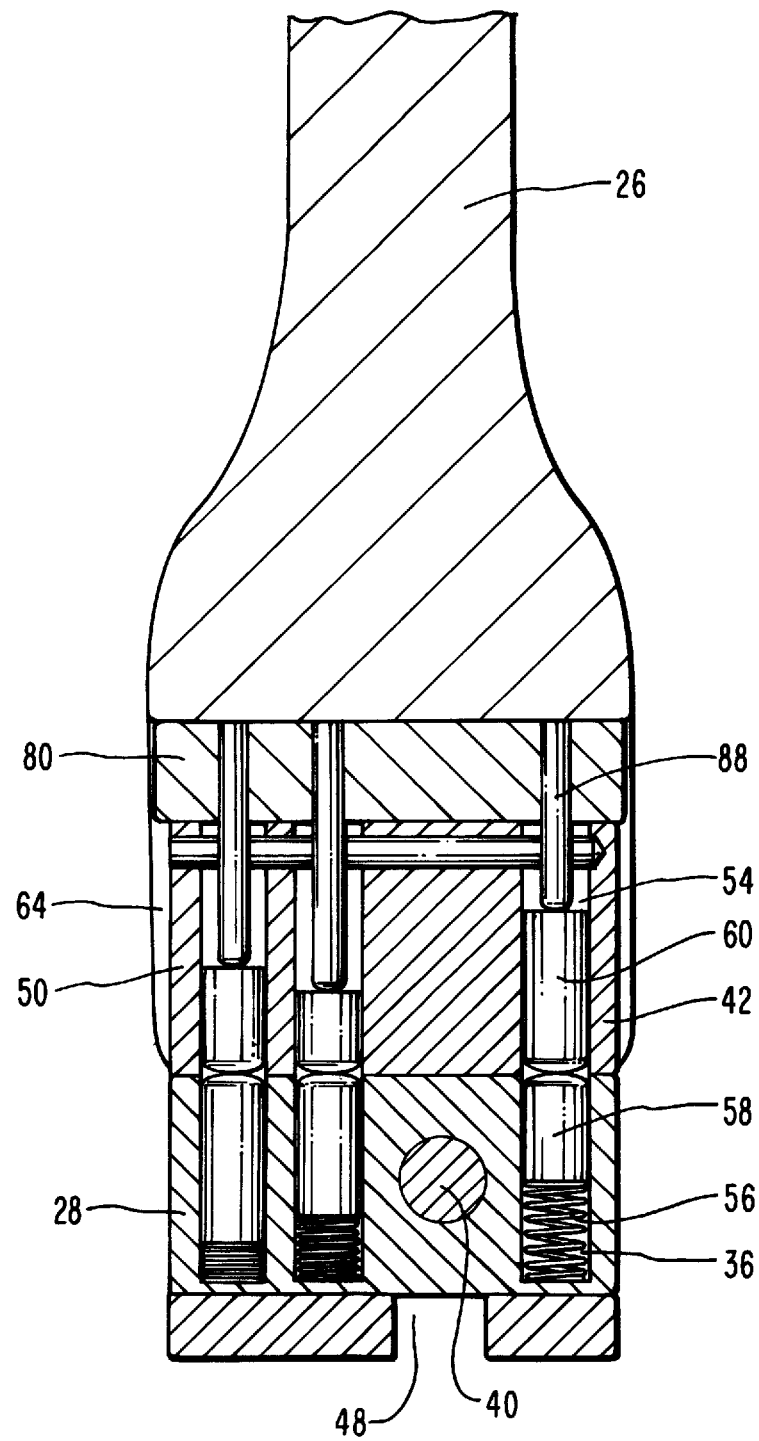
FIG. 4 is a cross-sectional front view of the camming lock shown in FIG. 3 having the lever inserted therein.
Figure 5:
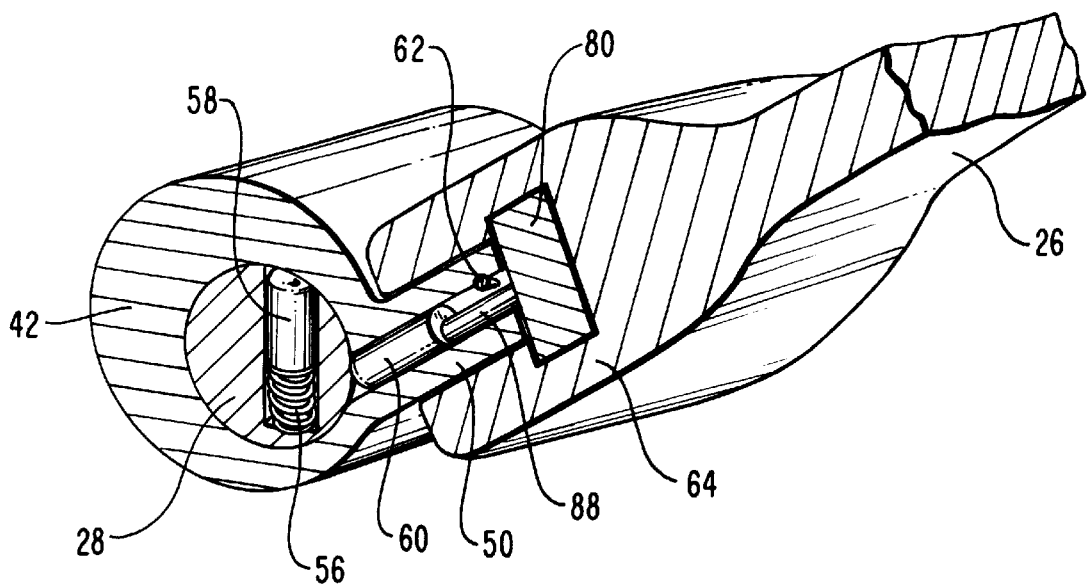
FIG. 5 is a partially cut-away perspective view of the lever rotating the camming lock shown in FIG. 4.

As best depicted in FIGS. 4 and 5, capture channel 76 is also configured to receive tongue 50 such that key pins 88 are individually received within individual of secondary locking slots 54. It is noted that each of key pins 88, alignment pins 60, and locking pins 58 have a predetermined, select length. More specifically, each key pin 88 is configured to advance alignment pin 60 within secondary locking slots 54 so that the contact point between alignment pin 60 and locking pin 58 is positioned at the intersection between exterior surface 34 of axle 28 and interior surface 44 of cam 42. This alignment is accomplished when key pins 88 are received within secondary locking slots 54 so that end-face 52 of tongue 50 is biased against lower face 84 of key block 80. As a result of this positioning of alignment pin 60 and locking pin 58, cam 42 is free to rotate relative to axle 28. The fact that intersecting end 59 of locking pin 58 and end 63 of alignment pin 60 are rounded facilitates easy rotation between cam 42 and axle 28.

Although camming lock 24 can be made without the use of alignment pin 60, alignment pin 60 provides an additional safety factor in preventing unwanted opening of camming lock 24 without the appropriate lever 26. For example, if alignment pin 60 is not advanced far enough, locking pin 58 remains straddling between axle 28 and cam 42. Alternatively, if alignment pin 60 is advanced too far, alignment pin 60 becomes straddled between axle 28 and cam 42, thereby performing the locking function of locking pin 58.

Based on the above disclosure, the length of each alignment pin 60 and locking pin 58 can be varied for each interconnecting primary locking slot 36 and secondary locking slot 54. Likewise each key pin 88 can be made having a different length to correspond to a desired length of alignment pin 60 and locking pin 58. Accordingly, by varying the available parameters such as the length and number of primary locking slot 36 and secondary locking slot 54 and the length of each spring 56, alignment pin 60, and locking pin 58, a vast number of camming locks 24 can be made to which only a uniquely configured lever 26 will unlock.

As a result of tongue 50 being positioned within capture channel 76, lever 26 can also be used for applying an effective leverage for selectively rotating cam 42 relative to axle 28. The leverage is obtained as a result of tongue 50 being captured between fingers 68 and 70 as lever 26 is rotated. Lever 26 thus serves the dual function of acting as a key to unlock camming lock 24 and as an elongated lever for both rotating cam 42 to an unlocked position and for rotating cam 42 to the locked position. Furthermore, since lever 26 is removed from camming lock 24, lever 26 can be made any desired length to optimize the desired amount of leverage needed without adding weight to camming lock 24.

As best shown in FIG. 5, once second locking slots 54 and primary locking slots 36 are rotated out of alignment, camming lock 24 remains in an unlocked position. This is because locking pins 58 are continually biased against interior surface 44 of cam 42 while alignment pins 60 are retained within secondary locking slot 54. However, once primary locking slots 36 and secondary locking slots 54 are again aligned and lever 26 removed, springs 56 again cause locking pins 58 to bias partially into secondary locking slots 54, thereby preventing annular rotation of cam 42 with respect to axle 28.

The present invention also includes a variety of means which are identified as performing select functions. For example, in one embodiment of the present invention, means which are at least partially removably connected to cam 42 are provided for enabling leverage rotation of cam 42 relative to axle 28. By way of example and not by limitation, one embodiment of the means includes tongue 50 radially projecting out from exterior surface 47 and lever 26 having capturing channel 76 formed thereon. As discussed above, capture channel 76 is configured to receive tongue 50 so as to enable rotation of cam 42. In alternative embodiments, a groove can be formed on exterior surface 47 of cam 42 and a tongue formed on lever 26 to be received within the groove. By inserting the tongue within the groove, lever 26 can be used for rotating cam 42.

Means are also provided for selectively locking axle 28 to cam 42 to prevent annular rotation of cam 42 relative to axle 28. By way of example and not by limitation, one embodiment of this means includes primary locking slots 36 formed in axle 28 and secondary locking slots 54 formed in cam 42. The means further includes spring 56 and locking pin 58 which are received within slots 36 and 54. As discussed above in greater detail, using this configuration, locking pin 58 can be used to selectively extend between axle 28 and cam 42, thereby preventing annular rotation of cam 42 relative to axle 28. In alternative embodiments, means can also include alignment pin 60 received within secondary locking slots 54. Likewise, the means also includes a plurality of slots 36 and 54 with springs 56, locking pins 58, and alignment pins 60 of various length being positioned within slots 36 and 54.

In another embodiment of the present invention, means which are at least partially removably connected to cam 42 are also provided for unlocking axle 28 and cam 42 and for enabling leverage rotation of cam 42 relative to axle 28. One embodiment of this means includes tongue 50 extending from exterior surface 47 of cam 42 and having the secondary locking slot 54 extending therethrough. The means also includes lever 26 having capture channel 76 formed thereon.

Received within capture channel is key pin 88 such that as tongue 50 is received within capture channel 76 key pin 88 is received within secondary locking slot 54. In this position, lever 26 functions both to unlock camming lock 24 and also enables leverage rotation of cam 42. In an alternative embodiment, the equivalent function can be achieved by forming a groove on exterior surface 47 of cam 42 so that secondary locking slot 54 is positioned within the groove. Likewise, a tongue could be formed on lever 26 with key pin 88 projecting from the tongue. Accordingly, as the tongue is received within the groove, key pin 88 is received within secondary locking slot 54. As such, lever 26 again functions to unlock camming lock 24 and enable leverage rotation of cam 42.

In yet another embodiment, means are provided for selectively recessing locking pin 58 within primary locking slot 36 to prevent rotation of cam 42 relative to axle 28. One embodiment of this means includes key pin 88 having the specific length needed to appropriately align locking pin 58. In an alternative embodiment, the means includes key pin 88 being attached to a separate structure such as lever 26.

Returning to FIG. 1, quick release mechanism 10 further includes a disk-shaped cradle 96 having a first side 98, an opposing second side 100, and an annular sidewall 102 extending therebetween. A passageway 104 extends between ends 98 and 100 and is configured to allow drawbar 18 to be received therein such that first end 98 can be positioned against camming lock 24.

Cradle 96 is also shown as having a recessed groove 106 formed on first end 98. Groove 106 is configured to substantially compliment exterior surface 47 of cam 42. As such, exterior surface 47 of cam 24 can be snugly received within groove 106. Projecting from second end 100 of cradle 96 is a stop 108 that will be discussed later in greater detail.

Positioned at second end 22 of drawbar 18 is an end cap 110. End cap 110 includes a first end 112, a second end 114, and a threaded passageway 116 extending therebetween. Threaded passageway 116 enables end cap 110 to be screwed onto second end 22 of drawbar 18. First end 112 of end cap 110 is shown as having an annular serrated face 118 bounding an annular recess 120.

Positioned between hub 12 and end cap 110 is a stop plate 122. Stop plate 122 also has a first end 124, a second end 126, and a passageway 128 extending therebetween. Passageway 128 is configured to allow drawbar 18 to pass therethrough but is not threaded so that stop plate 122 is free to slide along drawbar 18. Projecting from first end 124 is a stop 130 that will also be discussed later in greater detail. Formed on second end 126 are serrated grooves 132 that are configured to complimentary mesh with serrated face 118 on end cap 110.

Circling drawbar 18 between stop plate 122 and end cap 110 is a spring 134. Spring 134 is configured such that when spring 134 is in an unbiased position, spring 134 separates stop plate 122 from end cap 110. As discussed later in greater detail, by biasing stop plate 122 towards end cap 110, spring 134 is compressed within recess 120 such that serrated grooves 132 on stop plate 122 are interlocked with serrated face 118 on end cap 110. The interlocking between serrated grooves 132 and serrated face 118 prevents annular rotation of end cap 110 when stop plate 122 is held stationary.

The present invention also includes means for interlocking stop plate 122 and end cap 110 when spring 134 is compressed therebetween so that stop plate 122 and end cap 110 are biased together. By way of example and not by limitation, one example of this means includes serrated grooves 132 of stop plate 122 and serrated face 118 on end cap 110 which are configured to lock together. In alternative embodiments, any other type of conventional interlocking finger and groove configurations could likewise be used.

As previously discussed, quick release mechanism 10 is shown in FIG. 1 as being used for attaching a hub 12 of a bicycle wheel to forks 14 and 16 of a bicycle. Hub 12 is shown as having opposing ends 162 and 164 with an axle 166 extending therebetween and projecting from ends 162 and 164. Each fork 14 and 16 is shown as having an inside face 154 and an opposing outside face 156. Likewise each fork 14 and 16 has a tip 158 with a groove 160 formed therein.

During use, drawbar 18 is passed through axle 166 of hub 12 so that hub 12 is positioned between cradle 96 and stop plate 122. In addition, a pair of spacers 136 and 138 are directly positioned around drawbar 18 on opposing ends of hub 12. As shown in FIG. 1, spacers 136 and 138 are shown as comprising conically shaped springs. Annular disks or other spacers could also be used.

Next, camming lock 24 is unlocked and rotated so that the narrow portion 49 of cam 42 is positioned adjacent to cradle 96. In this position, the available length of drawbar 18 is maximized. Next, the opposing end of axle 166 of hub 12 are received within grooves 160 on forks 14 and 16 such that hub 12 is positioned between forks 14 and 16. In this position, spacers 136 and 138 are located against outside face 156 of forks 14 and 16.

Stop 108 of cradle 96 is then received within groove 160 on fork 16. Stop 130 on stop plate 122 is likewise received within groove 160 on fork 14. In this position, stop plate 122 and cradle 96 are prevented from annular rotation.

Next, end cap 110 is selectively positioned at a desired location along second end 22 of drawbar 18. Finally, as previously discussed, lever 26 is connected to tongue 50 and selectively rotated until primary locking slots 36 and secondary locking slots 54 are aligned. As cam 42 is rotated, wide portion 51 of cam 42 is biased against cradle 96, thereby effectively compressing all elements along drawbar 18 between cradle 96 and end cap 110. As the compressive force is applied, spring 134 is compressed within recess 120 such that serrated grooves 132 on stop plate 122 are interlocked with serrated face 118 on end cap 110 as previously discussed.

If the compressive force is insufficient to secure forks 14 and 16 on drawbar 18, camming lock 24 is again unlocked and end cap 110 advanced along drawbar 18 towards cam lock 24 and the process is repeated. If the compressive force is too great to enable locking of camming lock 24, end cap 110 is rotated away from camming lock 24.

Figure 6:
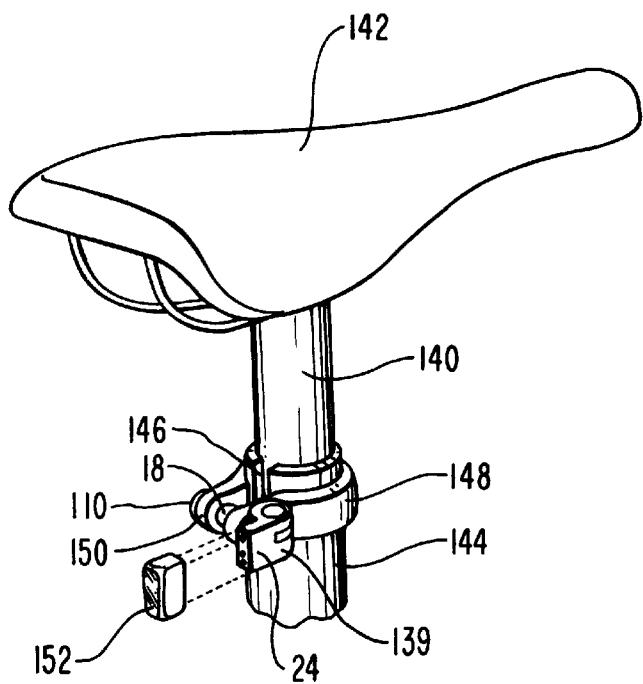
FIG. 6 is a perspective view of the camming lock shown in FIG. 2 securing a bicycle seat stem to a bicycle frame.

Although quick release mechanism 10 is shown as being used for attaching hub 12 to forks 14 and 16, there are a variety of alternative uses for which camming lock 24 can be used independently or in conjunction with quick release mechanism 10. By way of example and not by limitation, depicted in FIG. 6 is one embodiment of a quick release mechanism 139 used for securing a stem 140 of a bicycle seat 142 to a bicycle post 144. Post 144 has a compression slot 146 longitudinally extending therein. Likewise, a clamp 148 having opposing ends 150 is positioned around post 144 adjacent to slot 146. Quick release mechanism 139 is shown as comprising drawbar 18 having end cap 110 positioned at one end and camming lock 24 positioned at the other end. By selectively opening and closing camming lock 24, clamp 148 is selectively compressed and released around post 144, thereby selectively securing and releasing stem 140 within post 144. FIG. 6 also shows that a dust cap 152 can be formed to cover tongue 50, thereby preventing dirt or water from entering secondary locking slots 54.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A camming lock system comprising:
   (a) an axle having opposing ends with an exterior surface extending therebetween;
   (b) a cam comprising:
      (i) an interior surface defining a receiving chamber longitudinally positioned within the cam, the receiving chamber being configured to receive the axle so that the cam can rotate about the axle; and
      (ii) an exterior surface asymmetrically formed around the interior surface of the cam so that the distance between the interior surface and the exterior surface varies at points around the cam;
   (c) means for selectively locking the axle to the cam to prevent annular rotation of the axle relative to the cam; and
   (d) means at least partially removably connected to the cam for unlocking the axle and the cam and for enabling leveraged rotation of the cam relative to the axle.

2. A camming lock system as recited in claim 1, wherein the means for selectively locking the axle to the cam to prevent annular rotation of the axle relative to the cam comprises:
   (a) a primary locking slot formed on the exterior surface of the axle;
   (b) a secondary locking slot extending from the exterior surface of the cam to the interior surface of the cam, the secondary locking slot being selectively aligned with the primary locking slot;
   (c) a spring positioned within the primary locking slot; and
   (d) a locking pin positioned within the primary locking slot on top of the spring, the locking pin being configured to substantially reside within the primary locking slot when the primary locking slot and the secondary locking slot are not aligned, the locking pin also being urged by the spring to extend between the primary locking slot and the secondary locking slot when the primary locking slot and the secondary locking slot are aligned.

3. A camming lock system as recited in claim 2, wherein the means for selectively locking the axle to the cam to prevent annular rotation of the axle relative to the cam further comprises an alignment pin positioned within the secondary locking slot.

4. A camming lock system as recited in claim 2, wherein the means for unlocking the axle and the cam and for enabling leveraged rotation of the cam relative to the axle comprises:
   (a) a lever having a first end and an opposing second end; and
   (b) a key pin extending from the first end of the lever, the key pin being configured to be received within the secondary locking slot to selectively align the locking pin so that the cam can rotate relative to the axle.

5. A camming lock system as recited in claim 4, wherein the means for unlocking the axle and the cam and for enabling leveraged rotation of the cam relative to the axle comprises:
   (a) a tongue radially projecting out from the exterior surface of the cam, the secondary locking slot extending through the tongue to the receiving chamber;
   (b) a pair of fingers extending from the first end of the lever, the fingers defining a channel configured to receive the tongue so that rotation of the lever results in rotation of the cam; and
   (c) the key pin being positioned within the channel between the fingers on the lever so that the key pin is posited within the secondary locking slot when the tongue is received within the channel on the lever.

6. A camming lock system as recited in claim 4, wherein a tool is formed on the second end of the lever.

7. A camming lock system as recited in claim 4, further comprising:
   (a) a plurality of locking slots formed on the exterior surface of the axle; and
   (b) a plurality of secondary locking slots extending from the exterior surface of the cam to the interior surface of the cam.

8. A camming lock system as recited in claim 1, wherein the axle has a substantially cylindrical configuration.

9. A camming lock system as recited in claim 1, wherein the exterior surface of the cam has a substantially cylindrical configuration.

10. A camming lock system as recited in claim 1, wherein the distance between the interior surface and the exterior surface gradually varies in a smooth transition about the cam.

11. A quick release mechanism, the mechanism comprising:
    (a) a drawbar having a first end and an opposing second end;
    (b) an end cap mounted on the second end of the shaft;
    (c) a camming lock mounted on the first end of the shaft, the camming lock comprising:
       (i) an axle having an exterior surface and a primary locking slot recessed in the exterior surface;
       (ii) a cam comprising
          (A) an interior surface defining a receiving chamber longitudinally positioned within the cam, the receiving chamber being configured to receive the axle so that the cam can rotate about the axle;
          (B) an exterior surface asymmetrically formed around the interior surface of the cam so that the distance between the interior surface and the exterior surface varies at points around the cam; and
          (C) a secondary locking slot extending from the exterior surface of the cam to the interior surface of the cam, the secondary locking slot being configured so as to be selectively aligned with the primary locking slot;
       (iii) a spring positioned within the primary locking slot;
       (iv) a locking pin positioned within the primary locking slot on top of the spring, the locking pin being configured to substantially reside within the primary locking slot when the primary locking slot and the secondary locking slot are not aligned, the locking pin also being urged by the spring to extend between the primary locking slot and the secondary locking slot when the primary locking slot and the secondary locking slot are aligned;

(d) a lever having a first end with an alignment pin projecting therefrom, the alignment pin being configured to be received within the secondary locking slot to compress the locking pin within the primary locking slot when the primary and secondary locking slots are aligned, thereby enabling free rotation of the cam relative to the axle.

12. A quick release mechanism as recited in claim 11, further comprising:

(a) a tongue radially projecting out from the exterior surface of the cam; and (b) a channel formed on the lever, the channel being configured to receive the tongue so that the cam can be rotated by rotation of the lever.

13. A quick release mechanism as recited in claim 12, wherein the secondary locking slot extends through the tongue.

14. A quick release mechanism as recited in claim 11, further comprising a cradle slidably received on the drawbar adjacent to the camming lock, the cradle having a first side with a groove formed thereon, the groove being configured to receive the exterior surface of the cam.

15. A quick release mechanism as recited in claim 11, further comprising:

(a) a stop plate slidably received on the drawbar adjacent to the end cap;

(b) a spring slidably received on the drawbar between the stop plate and the end cap; and (c) means for interlocking the stop plate and the end cap when the spring is compressed between the stop plate and the end cap so that the stop plate and the end cap are biased together.

16. A quick release mechanism as recited in claim 11, further comprising a rotation slot extending between the exterior surface of the cam and the interior surface of the cam, the rotation slot being configured to allow the first end of the drawbar to pass therethrough for attachment to the axle.

17. A quick release mechanism comprising:

(a) a drawbar having a first end and an opposing second end;

(b) an end cap mounted on the second end of the drawbar;

(c) a camming lock mounted on the first end of the drawbar; the camming lock comprising:

(i) an axle having an exterior surface and a primary locking slot recessed in the exterior surface;

(ii) a cam comprising (A) an interior surface defining a receiving chamber longitudinally positioned within the cam, the receiving chamber being configured to receive the axle so that the cam can rotate about the axle;

(B) an exterior surface asymmetrically formed around the interior surface of the cam so that the distance between the interior surface and the exterior surface varies at points around the cam;

(C) a tongue radially projecting out from the exterior surface of the cam to an end face; and (D) a secondary locking slot extending from the end face of the tongue to the interior surface of the cam, the second locking slot being configured so as to be selectively aligned with the primary locking slot;

(iii) a spring positioned within the primary locking slot;

(iv) a locking pin slidable within the primary locking slot on top of the spring;

(v) an alignment pin slidably disposed within the secondary locking slot;

(d) a lever having a first end and an opposing second end, the lever comprising:

(i) a channel configured to selectively receive the tongue on the exterior surface of the cam, thereby enabling levered rotation of the cam relative to the axle; and (ii) a key pin projecting from within the channel, the key pin being configured to be received within the secondary locking slot to compress the locking pin within the primary locking slot when the tongue is received within the channel, thereby enabling free rotation of the cam relative to the axle.

18. A quick release mechanism as recited in claim 17, further comprising a cradle slidably received on the drawbar adjacent to the camming lock, the cradle having a first side with a groove formed thereon, the groove being configured to receive the exterior surface of the cam.

19. A quick release mechanism as recited in claim 17, further comprising:

(a) a stop plate slidably received on the drawbar adjacent to the end cap;

(b) a spring slidably received on the drawbar between the stop plate and the end cap; and (c) means for interlocking the stop plate and the end cap when the spring is compressed between the stop plate and the end cap so that the stop plate and the end cap are biased together.

20. A quick release mechanism as recited in claim 17, further comprising a rotation slot extending between the exterior surface of the cam and the interior surface of the cam, the rotation slot being configured to allow the first end of the drawbar to pass therethrough for attachment to the axle.

* * * * *